Figure 7:
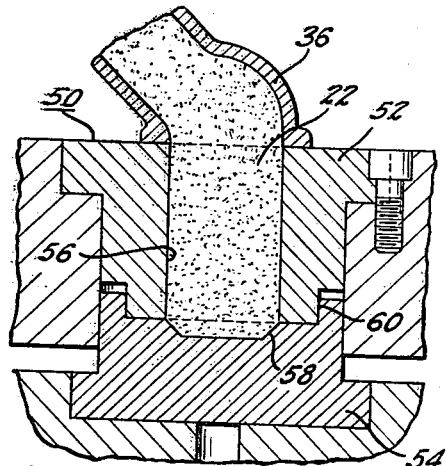
Figure 8:
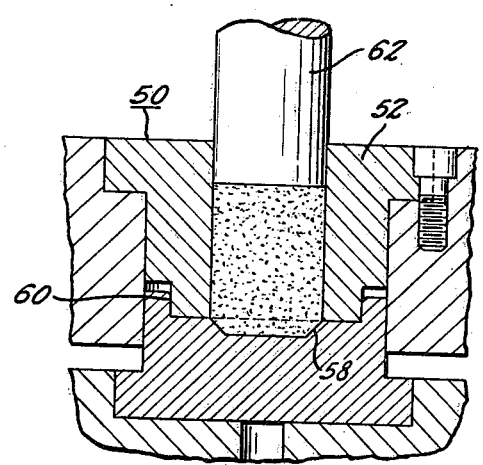
Figure 9:
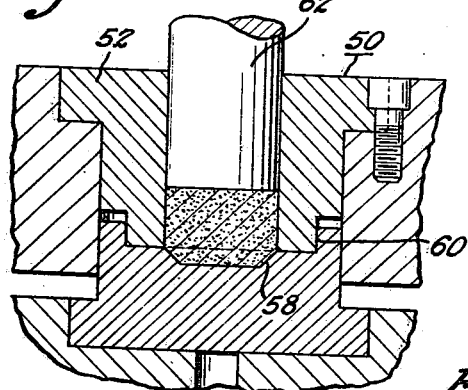

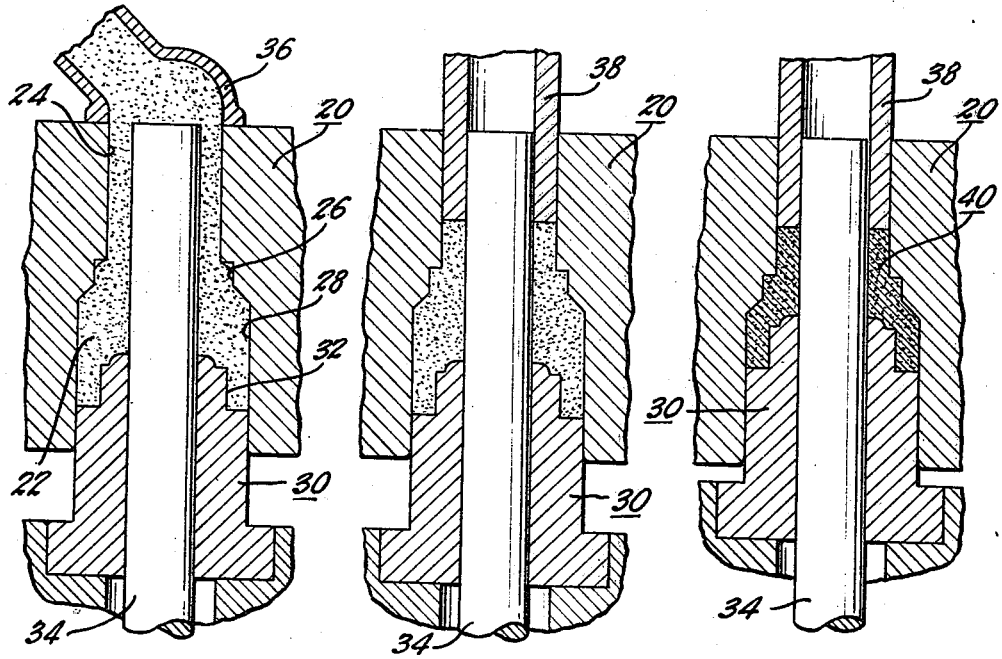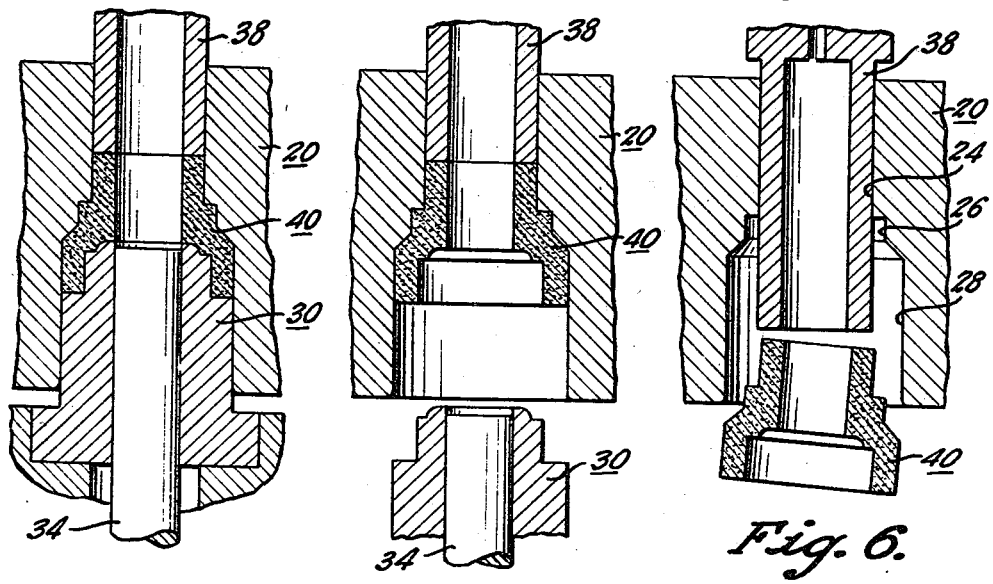
Fig. 1. Fig. 2. Fig. 3. Fig. 4. Fig. 5. Fig. 6.
INVENTOR
Lee L. Kurtz Sept. 5, 1944. L. L. KURTZ 2,357,407
METHOD OF MANUFACTURE
Filed May 28, 1941 2 Sheets-Sheet 2

INVENTOR
Lee L. Kurtz
BY
his ATTORNEYS

Patented Sept. 5, 1944

2,357,407

UNITED STATES PATENT OFFICE 2,357,407

METHOD OF MANUFACTURE

Lee L. Kurtz, Dayton, Ohio, assignor to General Motors Corporation, Detroit, Mich., a corporation of Delaware Application May 28, 1941, Serial No. 395,649

3 Claims. (Cl. 18—55)

This invention relates to the molding of powdered materials and is particularly concerned with molding powdered materials such as metal powders into desired shapes.

An object of the invention is to provide a method for briquetting powdered materials particularly powdered metals wherein the articles briquetted comprise porous masses having increasingly large diameters thereon and wherein the powdered metal may be filled into the top of a die or mold and after the material has been compressed the article formed thereon may be ejected from the opposite end of the mold.

A further object is to provide a method whereby dies or molds having increasingly large diameters thereon may be filled from the smaller diameter end thereof with materials which will flow by gravity into the mold, which powdered material may be compressed preferably from opposed axial directions after which the compressed material may be ejected from the large diameter end of the mold.

Further objects and advantages of the present invention will be apparent from the following description, reference being had to the accompanying drawings wherein a preferred embodiment of the present invention is clearly shown.

In the drawings:

Figs. 1 thru 6 are fragmentary sectional views of a die used in briquetting metals by the method claimed herein showing the progressive steps in the method.

Figs. 7 through 12 are fragmentary sectional views of another type of die used in briquetting metals by the method claimed herein wherein the article formed is shown during the progressive steps of manufacture.

When briquetting powdered materials it is difficult and often impossible to obtain uniform density in articles which include annular portions therein of increasingly greater inner and outer diameter such as the bushing shown in the drawings.

Conventional briquetting machinery provides for the filling of the mold from one end thereof, the briquetting of the material in the mold and the ejection of the briquette from the same end of the mold through which the filling thereof was accomplished. It is apparent, referring to the drawings, in the present instance, that molds for articles having a plurality of increasing complementary inner and outer diameters thereon presents a large surface area for the punch which includes a series of increasingly larger diameter steps thereon and due to the large surface area presented and the difficulty in obtaining free flow of metal powder, the density of the briquette formed is not uniform but is greater in certain portions thereof than in others. By means of reversing the mold and filling from the small diameter end thereof, it is possible to get the powder to flow into place by gravity and then, after briquetting, the article may be removed from the opposite end. This assures briquettes having substantially uniform density throughout which may be formed in a relatively simple manner without excessive pressure being utilized.

Another difficulty in the briquetting of metal powder occurs when spherical surfaces or chamfered end surfaces are to be formed in the briquetted article. It is apparent that if a chamfered end surface or a semi-spherical end surface is to be formed in the briquetted article that the punch must necessarily carry a complementary configuration to that desired in the briquetted article. In order to make a perfect chamfered or a perfect semi-spherical surface it is, therefore, necessary that the edge of the punch which rides against the side of the die surface approximates a feather edge with substantially no thickness of stock apparent. Obviously, this is impossible to accomplish with the result that in the usual type of equipment the punch is ground off so that the end thereof has up to .010 of stock. This, of course, leaves a ridge at the end of the article making the semi-spherical surface have a step in the portion thereof which joins the cylindrical surface, which step is objectionable.

The present invention obviates these difficulties and makes possible the briquetting of articles having semi-spherical surfaces or chamfered end surfaces thereon which blend in perfectly with the cylindrical surfaces of the remainder of the article. This is accomplished by placing the chamfered or semi-spherical surface in one portion of the die and the cylindrical surface in another portion of the die whereby no feather edge punches are required during the briquetting operation.

Referring to the drawings, Fig. 1 shows the first step in the method of making briquetted articles wherein the filling of the mold is accomplished from the small diameter end thereof and wherein the lower plunger which is the bottom wall of the mold is in place. By filling in this manner the mold is accurately filled with metal powder by the aid of gravity wherein the distribution of powder is such that upon subsequent compression steps, as shown in Figs. 2 and 3, a briquette of substantially uniform density throughout is formed. More specifically, referring to Fig. 1, a mold 20 is provided, which has a cavity 22 therein that includes a small diameter portion 24, an intermediate diameter portion 26 and a large diameter portion 28. The mold equipment includes a lower plunger 30 which provides the lower wall 32 for the mold cavity when the plunger 30 is in place, as shown in Fig. 2. Thru the center of the plunger 30 is positioned a core rod 34 which forms a core for the article, which in this case, is a bushing of predetermined shape. The mold cavity is filled by the conventional type filling shoe 36 through the small diameter end 24 thereof whereupon an upper punch 38 compresses the powder in the small diameter portion 24, as shown in Fig. 2. The punch 38 then remains stationary while the lower punch 30 is moved to a position shown in Fig. 3, whereupon the metal powder is briquetted to the desired size and shape, namely a bushing 40.

The next step of the process comprises the removal of the core rod 34, as shown in Fig. 4 and subsequent withdrawal of plunger whereupon the upper plunger 38 moves downwardly to eject the bushing 40 from the mold.

In this manner a briquetted article of desired size and shape may be formed which is later preferably heat treated, which in the case of powdered metal is accomplished in a suitable sintering furnace under desired conditions. It is manifest that any type of material may be utilized in accordance with the type of article desired likewise this briquetting method may be used in connected with the formation of other types of articles made from other types of powders such as ceramics.

Figure 10:
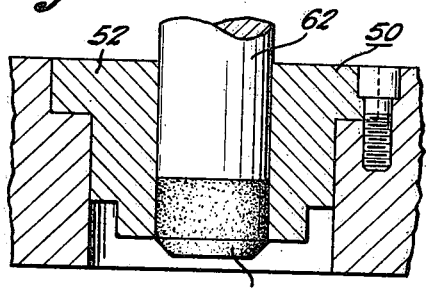
Figure 11:
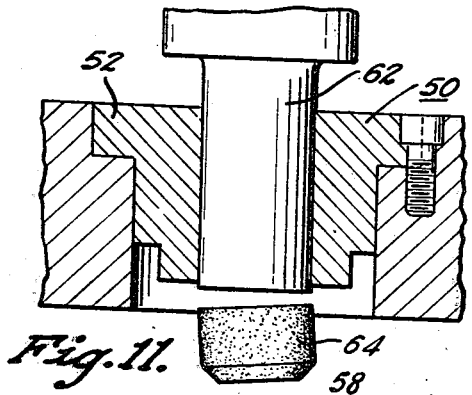
Figure 12:
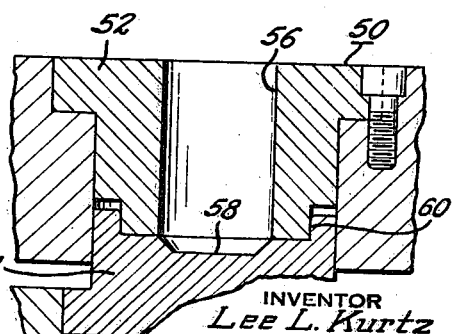

Figs. 7 through 12 snow the progressive steps in the briquetting of an article from metal powder which article has a chamfered end surface thereon. In this instance, a two part die 50 is used which has an upper portion 52 and a lower portion 54. The upper portion 52 has a cylindrical bore 56 therethrough while the lower portion 54 has the chamfered end of the cavity 58 thereon. The portion 58 is preferably held in alignment with the bore 56 by means of an interlock 60 between the two die portions. Fig. 7 shows the conventional shoe 36 for filling the cavity with metal powder. After the cavity is filled with the powder 22, the shoe 36 is removed and a punch 62 is pressed into the cavity to compress the powder into a briquette 64 as shown in Fig. 10. At this point, the lower portion 54 of the die is removed and the briquette 64 is pressed downwardly by the punch 62 as shown in Fig. 11. The lower die member 54 is then replaced as shown in Fig. 12 and the die is in position for refilling. It will be noted that in the construction shown that a perfect chamfered end may be obtained, or if desired, the lower portion 54 may carry a semispherical cavity which is aligned with the cylindrical bore of the upper die member 52. In all cases, the filling of the mold is accomplished from the top thereof and then the briquette is ejected from the bottom in direct contrast to conventional types of mold.

While the embodiment of the present invention as herein disclosed, constitutes a preferred form, it is to be understood that other forms might be adopted, all coming within the scope of the claims which follow.

What is claimed is as follows:

1. A method of molding an article from powdered material, which article has a bore therein of at least two different diameters, the steps comprising: providing a die having a cavity therein, providing a plug, which plug has a contour similar to the shape of the bore desired in the final article to be formed, inserting the plug into the die cavity from one end thereof so that the largest diameter of the plug forms one end of the die cavity, filling the die cavity with powdered material from the other end thereof whereby the powdered material falls into the die cavity and around the plug by gravity, providing a punch, inserting the punch into the die cavity from the end thereof through which the cavity was filled for partially compressing the powdered material therein, moving the plug toward the punch while holding the punch stationary to completely compress the powdered material within the die cavity, then while maintaining the punch in position removing the plug from the die, and finally ejecting the article from the die cavity by continuing the movement of the punch whereby the article is ejected from the cavity at the end opposite from which the cavity was filled.

2. In a method of molding an article of powdered material which article has an outer contour of at least two diameters of ever increasing size and a bore therein having at least two diameters wherein the largest diameter portion of the bore is opposite to the smallest diameter portion of the outer contour of the article, the steps of; providing a die having a cavity therein, providing a plug, which plug has a contour similar to the shape of the bore desired in the final article to be formed, inserting the plug into the die cavity at the largest diameter end thereof to provide a bore therein and to close the largest diameter end of the cavity, pouring powdered material into the die cavity from the smallest diameter end thereof so to fill the cavity with the powdered material by the action of gravity, providing a punch, inserting the punch into the smallest diameter end of the cavity and partially compressing the powdered material therein, maintaining the punch in a stationary position, then moving the plug toward the punch to completely compress the powdered material within the die cavity, removing the plug from the die and finally ejecting the article from the die cavity through the opposite end to which it was filled by further movement of the punch.

3. In a method of molding an article from powdered material, which article has a bore therein including at least two progressively decreasing diameters wherein the largest diameter end of the bore is adjacent one end of the article, the steps comprising; providing a die having a cavity therein open at both ends thereof, closing one end of the cavity with a plug which includes a core portion thereon having a contour similar to the shape of the bore desired in the final article, filling the die cavity with powdered material from the open end thereof whereby the powdered material is disposed around the plug by gravity, closing the open end of the die cavity, and then compressing the powdered material by movement of the plug with the die cavity to form an article of self sustaining shape, removing the plug, and then ejecting the article from the die cavity from the end opposite to which the powdered material was filled into the die cavity

LEE L. KURTZ.